Figure 1:
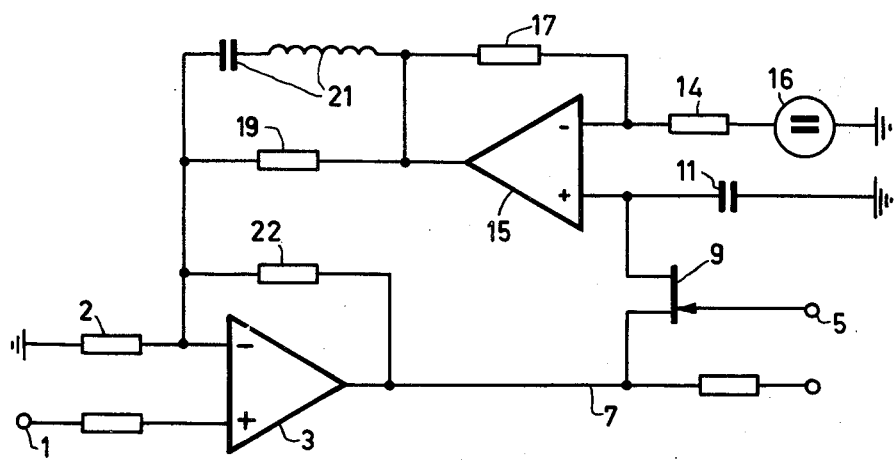

United States Patent [19]

Minjon

[11] 4,159,485
[45] Jun. 26, 1979

[54] AMPLIFIER FOR A VIDEO SIGNAL FROM AN IMAGE PICK-UP DEVICE

[75] Inventor: Willem D. Minjon, Eindhoven, Netherlands

[73] Assignee: U.S. Philips Corporation, New York, N.Y.

[21] Appl. No.: 836,685

[22] Filed: Sep. 26, 1977

[30] Foreign Application Priority Data

Oct. 1, 1976 [NL] Netherlands .................. 7610859

[51] Int. Cl.² .............................................. H04N 5/21
[52] U.S. Cl. ................................................... 358/167
[58] Field of Search ............. 358/111, 167, 172, 177, 358/184, 188, 178; 328/162

[56] References Cited

U.S. PATENT DOCUMENTS

| | | |
|---|---|---|
| 3,560,648 | 2/1971 | Kitsopoulos .................. 358/178 |
| 3,829,606 | 8/1974 | Kawamata et al. ............ 358/178 X |
| 3,845,326 | 10/1974 | Godden ...................... 358/172 X |

OTHER PUBLICATIONS

The International Dictionary of Physics and Electronics © 1956, pp. 337, 777.

Primary Examiner—Robert L. Griffin
Assistant Examiner—Aristotelis M. Psitos
Attorney, Agent, or Firm—Thomas A. Briody; William J. Streeter; Henry I. Steckler

[57] ABSTRACT

A clamping circuit in a video chain of a camera features a series L-C network in a feedback circuit. Interference in the video signal, resulting from the occurrence of microphony in the pick-up tube, can thus be suppressed. When the L-C network is suitably detuned, the resonant frequency signal (microphony frequency) of the grid of the pick-up tube can be fully compensated for in the video signal as regards amplitude and phase using adequate feedback.

5 Claims, 2 Drawing Figures

AMPLIFIER FOR A VIDEO SIGNAL FROM AN IMAGE PICK-UP DEVICE

The invention relates to a video amplifier for a video signal generated in an image pick-up device, said video amplifier comprising an amplifier stage adapted to receive a video signal, an output of which is connected to an input of a sampling circuit for sampling an output signal from the amplifier stage during the line flyback period, the output of said sampling circuit being connected to a comparison circuit, which is also adapted to receive a reference signal from a reference source, the output of said comparison circuit being adapted to provide a correction voltage which is proportional to the difference between the output signal and the reference signal, which output is connected to the amplifier stage. The invention furthermore relates to an image pick-up device comprising an image pick-up tube for generating, by means of an electron beam, a video signal on the basis of a charge image formed on a radiation-sensitive target, and a video amplifier.

Video amplifiers for video signals in image pick-up devices are generally known and are often used in medical X-ray diagnosis, for example, as described in United Kingdom patent specification No. 1,400,471. An image pick-up tube is often subject to mechanical shocks or vibrations. In medical diagnostics particularly where the image pick-up tube is connected to a cine-camera for the simultaneous display of X-ray images and the recording of these images in a photographic manner, shocks and vibrations often occur. These mechanical vibrations cause interference in the video signal which is referred to as microphonic interference. A gauze-like grid is connected opposite the target in an image pick-up tube. Between the target and the grid a potential difference exists of between 300 and 900 volts, in dependence of the type of pick-up tube. The target and the grid together constitute a capacitor microphone which converts mechanical vibrations of the pick-up tube into an electrical signal current. The signal current generated by the vibrations is superposed on the normal video signal generated by the electron beam during the reading of the charge image on the target. As the illumination of the target is weaker, the microphonic interference will be more noticeable in the video signal originating from the image pick-up tube. The frequency range in which the microphonic interference is situated is dependent of the rigidity and the suspension of the grid. The mechanical resonant frequency of the grid is particularly significant in mirophonic interference. This resonant frequency could be suppressed by connecting a resonant parallel network of a coil and a capacitor in series with the amplifier circuit for the video signal. However, parts of the useful video signal are then also suppressed, which is not desirable.

The invention has for its object to provide a video amplifier, and an image pick-up device employing such an amplifier circuit, in which the microphonic interference can be substantially suppressed and in which the useful video signal can remain unaffected.

To this end, an amplifier circuit in accordance with the invention is characterized in that the connection between the output of the comparison circuit and the amplifier stage includes a series resonance network. By using such a resonant network which may be series L.C. network the frequencies of the microphonic interference which are situated in the pass-band of the resonant network are fed back stronger than the other frequencies. Substantially complete suppression of microphonic interference can be achieved by adapting the resonant frequency of the series network to the resonant frequency of the grid in the image pick-up tube.

Figure 2:
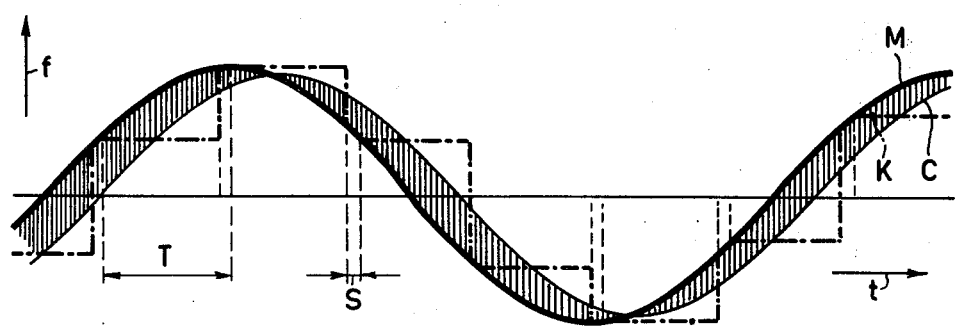

The invention will be described in detail hereinafter by way of example with reference to the accompanying diagrammatic drawing, in which FIG. 1 shows a diagram of a circuit according to the invention, and FIG. 2 shows a time diagram of the variation of microphonic interference, a correction voltage and residual interference.

The input 1 of the circuit shown in FIG. 1 receives the disturbed video signal generated in an image pick-up tube of a television camera (not shown). The video signal is amplified by a differential amplifier stage 3. A main path electrode of an n-channel field effect transistor 9 is connected to the output 7 of the amplifier stage 3. The transistor 9 and a capacitor 11 connected to the other main path electrode of transistor 9 together constitute a sampling circuit. When a pulse of the correct polarity is applied to the control electrode 5 of the transistor 9, the transistor 9 becomes conducting. The pulse has a duration of, for example, 4 $\mu$s. During conduction of the transistor 9, the capacitor 11 is charged or discharged in accordance with the instantaneous output signal on the output 7. After completion of sampling, the charge of the capacitor 11 remains unchanged until the next sampling period. The capacitor 11 is also connected to the non inverting (+) input of a differential amplifier 15. A reference source 16 is connected to the inverting (−) input of the amplifier 15 via a resistor 14. The voltage difference between the inputs of the amplifier 15 is amplified and applied, via a resistor 19, to the inverting (−) input of the amplifier stage 3. The gain factor of the amplifier 15 and the amplifier stage 3 are adapted to each other, so that the loop amplification of the circuit is approximately unity, with the result that the video signal applied via the input 1 is reduced by a constant correction signal which is substantially equal to the difference between the reference signal and the output signal of the amplifier stage 3 at the sampling period.

Because mechanical shocks and vibrations cause the gauze-like grid in a pick-up tube to oscillate at its resonance frequency, it is useful to connect a series reconance network 21 parallel to the resistor 19. The coil and the capacitor together form a low impedance for the resonant frequency of the grid, so that in particular this frequency is strongly fed back. The resonance network 21 may comprise, for example, a capacitor of 120 nF and a coil of 64 mH. FIG. 2 diagrammatically shows the extent of the suppression of the microphonic interference M. It is assumed that the interference is sinusoidal and has a frequency of approximately 2500 Hz. The symbol T represents one television line period for the system used with the image pick-up tube which is approximately 64 $\mu$s. The sampling period S has a duration of 4 $\mu$s and occurs during the line fly back period. The signal K, being stepped as a function of time, is a constant voltage during the sampling periods, this voltage appearing on the output of the amplifier 15. Due to the L-C network 21, the correction voltage denoted by C appears at the input of the amplifier 3, the amplitude of this correction voltage being substantially equal to that of the interference M. The interference M can be further suppressed by correct detuning of the L-C network 21 relative to the resonant frequency of the grid in the pick-up tube. This can be explained as follows. If the sampling interval T (=line time) is small enough relative to the period of the interference M, the stepped signal K also includes a component having a frequency which is equal to the frequency of the interference M. When the L-C network 21 is tuned to this frequency, the correction voltage C has the highest possible amplitude. The phase of the signal C, however, is delayed relative to the signal M (25° to 35°). When the L-C network 21 is not tuned to the frequency of the signal M, but rather to a neighbouring frequency, the phase difference can be eliminated. The degree of detuning is dependent of the output impedance of the amplifier 15, the value of resistor 19 and the input impedance of the amplifier stage 3 which is determined among other things by the resistors 2 and 22. As the detuning increases, C increasingly approximates to K.

The resistor 17 across the differential amplifier 15 may be replaced by a capacitor, so that the amplifier operates as an integrator. The RC time is determined by this capacitor and the resistor 14 and should be approximately a factor 10 larger than the line period T. The horizontal parts of the stepped signal K will then be inclined due to the connection of the amplifier 15 as an integrator. The signal K is either positive or negative, the slope being positive and negative, respectively. The desired effect thereof consists in that the amplitude of the signal C will increase by a certain amount. The undesired phase difference can then be eliminated by correct detuning of the LC network, a correction voltage C then remaining which is larger than that of the circuit shown in FIG. 1.

What is claimed is:

1. A video amplifier for a video signal generated in an image pick-up device, said video amplifier comprising an amplifier stage having an input adapted to receive a video signal and an output, a sampling circuit means having an input coupled to said amplifier output and an output for sampling an output signal from the amplifier stage during the line flyback period, a comparison circuit having a pair of inputs, one input coupled to said sampling means output and the second input adapted to receive a reference signal from a reference source respectively and an output means for providing a correction signal which is proportional to the difference between the reference signal and the output signal from the amplifier stage, and means for compensating for microphonic signals generated in said pick-up device comprising a resonance network coupled between the output of the comparison circuit and the amplifier stage.

2. A video amplifier as claimed in claim 1, wherein said resonant network is a series L.C. network.

3. A video amplifier as claimed in claim 1, wherein the comparison circuit comprises a differential amplifier having a non inverting input coupled to the output of said sampling circuit and an inverting input coupled to said reference source, and a feedback element coupled between the output of said differential amplifier and its inverting input.

4. A video amplifier as claimed in claim 3, wherein said feedback element comprises a capacitor, said differential amplifier operating as an integrator.

5. A video amplifier as claimed in claim 3, wherein said resonant network comprises a series LC network.

* * * * *